Jan. 6, 1959    B. L. MIMS    2,867,114
TORQUE METER FOR TESTING BEARINGS
Filed Aug. 11, 1954    2 Sheets-Sheet 1

INVENTOR.
BRUCE L. MIMS
BY Harry L. Shewer
ATTORNEY

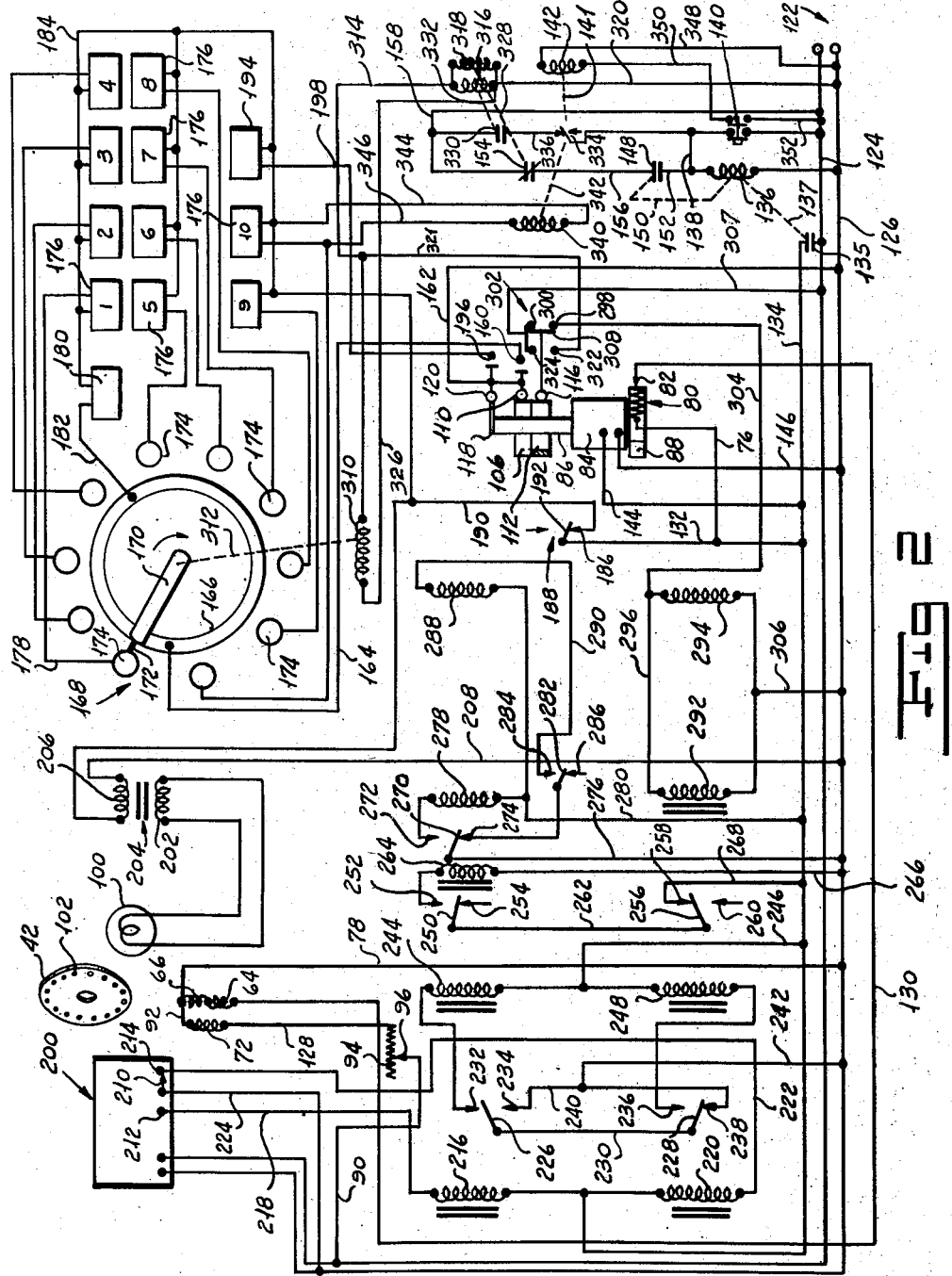

United States Patent Office 2,867,114
Patented Jan. 6, 1959

2,867,114

TORQUE METER FOR TESTING BEARINGS

Bruce L. Mims, Danbury, Conn., assignor to The Barden Corporation, Danbury, Conn., a corporation of Connecticut Application August 11, 1954, Serial No. 449,183

12 Claims. (Cl. 73—9)

My invention relates to a torque meter and more particularly to a meter for measuring the starting torque of rolling bearings to determine whether or not a particular bearing is representative of its production group.

In the manufacture of precision rolling bearings a production test which is made is a determination of the torque necessary to start the bearing rolling. Torque testers of the prior art for determining the starting torque of a rolling bearing generally employ meters for giving only a single reading of starting torque for each particular test. This single reading is compared in a pass-fail test with an arbitrary production criterion. These meters of the prior art depend for their accuracy on the intelligence and skill of the individual operator. They are complicated devices which are slow and inconvenient to use. No satisfactory meter has been developed which may be employed in the analysis of the torque characteristics of a bearing.

The starting torque of a bearing cannot truly be represented by a single reading or determination. Each bearing has an average starting torque value. Slight imperfections in the balls and races, retainer drag, dirt, and variations in retardation resulting from the lubricant employed cause the starting torque to fluctuate about the average value. It will be appreciated that the torque of a bearing is properly treated as a statistical quantity. Meters of the prior art, which take only a single torque reading during one operation of the testing device, fail to take into account the statistical nature of rolling bearing starting torque. An individual measurement of starting torque may be outside of an arbitrary acceptance standard set for a test in which individual readings only are rare. A statistical presentation of a number of random readings for the same bearing might indicate that the bearing actually was representative of its production group. It will be appreciated also that a number of individual readings obtained in separate tests on a bearing would not prove as satisfactory for an analysis of the bearing torque quality as would a number of readings automatically taken at random.

I have invented a torque meter which takes advantage of the statistical nature of starting torque by taking random readings for the starting torque of the bearing under test during a particular test. My meters is, moreover, arranged to treat and present the resulting data statistically. Tests may be made with my meter in a rapid and expeditious manner. The tests are made automatically so that they do not depend for their accuracy on the skill or the intelligence of the operator. These tests result in data which may be used either in a pass-fail test or for analysis of the bearing starting torque. My meter provides consistency in measurement and reproducibility of individual measurements made during a test.

One object of my invention is to provide a torque meter for determining the starting torque of a rolling bearing with a high degree of accuracy.

Another object of my invention is to provide a torque meter which produces a statistical representation of the starting torque characteristic of a rolling bearing.

A further object of my invention is to provide a torque meter for determining whether a particular rolling bearing is representative of its production group.

Yet another object of my invention is to provide a torque meter for determining the starting torque of a rolling bearing in a rapid and expeditious manner.

A still further object of my invention is to provide a torque meter for measuring the starting torque of rolling bearings independently of the skill and the intelligence of an operator.

Other and further objects of my invention will appear from the following description.

In general, my invention contemplates the provision of a stand on which a bearing to be tested is supported by its inner race. In order to provide a means by which torque may be applied to the bearing to measure its starting torque, I dispose a rotor on the outer race of the bearing. I provide means for applying a gradually increasing torque to the rotor until the rotor and outer race of the bearing begin to rotate. Means are provided for detecting a predetermined rotation of the rotor and outer race. Suitable counting means are provided for making a digital record of the gradually increasing torque necessary to produce a predetermined rotation. Relay means responsive to the detecting means are actuated to disconnect the counting means at the end of the predetermined rotation of the rotor. When the digital record has been made for one torque measurement, the torque applied to the rotor is increased to spin it, then removed, and the rotor is permitted to coast to a new random position. The test is then automatically repeated for any desired number of times. The counting devices provide records of the individual measurements of torque as well as a record of the sum of these measurements. The individual records may be employed to analyze the bearing torque characteristic and to determine if the torque during a particular measurement of the group is excessively high. The sum of all the torque measurement may readily be employed in a pass-fail test.

In the accompanying drawings which form part of the instant specification and which are to be read in conjunction therewith and in which like reference numerals are used to indicate like parts in the various views:

Figure 2 is a schematic view of one form of electrical circuit which may be employed in my torque meter.

Figure 1:
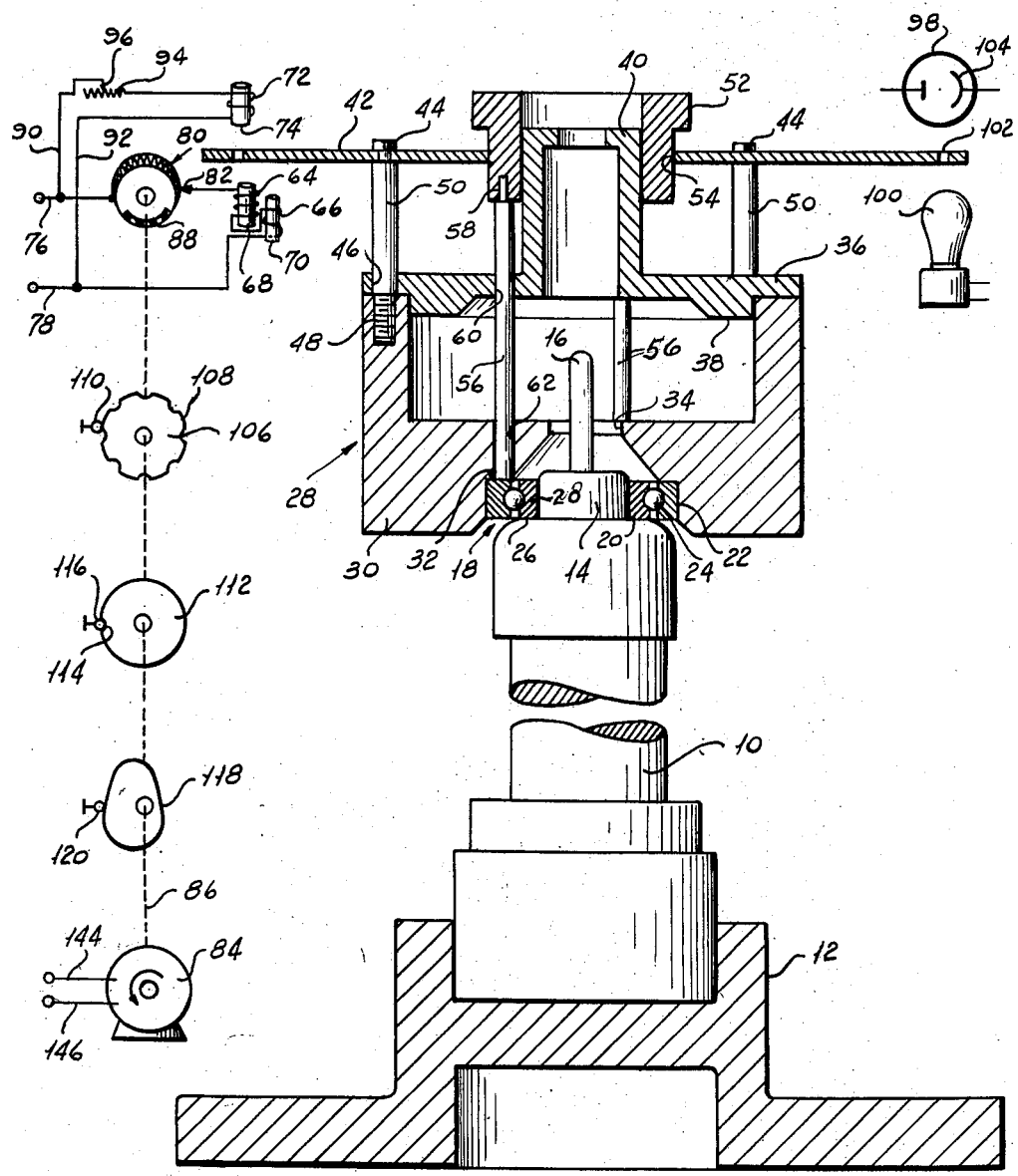
Figure 1 is a sectional view, with parts indicated schematically, of my torque meter.

More particularly referring now to the drawings, my torque meter includes a stand 10 fixed in an appropriate base 12 and provided with a collar 14 carried by a pin 16 fixed in the upper end of the stand 10 as viewed in Figure 1. The bearing to be tested, indicated generally by the reference character 18, includes an inner race 20, an outer race 22, and rolling elements 24. This bearing is placed on the stand 10 in a manner to be supported by its inner race 20 on an annular shoulder 26 formed at the top of stand 10 by the removable collar 14. It will readily be appreciated that the dimensions of the collar 14 are selected to correspond with the inner diameter of the inner race of the bearing being tested.

In order to apply a torque to the bearing 18 to rotate it, I provide a rotor, indicated generally by the reference character 28. Rotor 28 includes a member 30 the base of which is formed with an annular recess forming a shoulder 32 by means of which the rotor is supported on the outer race 22 of the bearing under test. This recess is tapered and continued through the base of the member 30 to form an opening 34 through which pin 16 extends when the rotor is mounted on the outer bearing race. It will be appreciated that the taper of the recess is such that only the outer race 22 of the bearing is contacted by the rotor. A cap 36 formed with a depending annular boss 38 fits over the member 30. It can be seen that the annular boss 38 of the cap 36 fits within the opening in the member 30. Cap 36 is formed with an upstanding cylindrical boss 40 at its center.

In order to provide a means for applying a torque to rotor 28, I mount an eddy current disk 42 on the rotor 28. This disk, as will be explained hereinafter, functions in the manner of the moving element of an induction watt hour meter. A number of machine screws 44 provide the means for securing the disk 42 to the rotor assembly 28. These screws pass through the disk 42 through holes 46 in the cap 36 and are threaded into holes 48 spaced around the periphery of the member 30. Spacers 50 surround the shanks of screws 44 to space disk 42 from cap 36. The rotor assembly is completed by a cylindrical member 52 disposed within a central opening 54 in the disk 42. A plurality of rods 56 have reduced portions 58 at one end thereof. The reduced portions 58 are press fit into corresponding openings spaced around the periphery of the lower end of member 52 as viewed in Figure 1. It is readily seen that the cylindrical member 52 surrounds the cylindrical boss 40 provided at the center of cap 36. When the rotor is assembled, rods 56 pass through openings 60 in the cap 36 and openings 62 in the base of the member 30 so as to bear on the outer race 22 of the bearing under test.

In order to provide a means for generating eddy currents in the disk 42 in a manner to cause a rotation of the disk and rotor, I dispose a pair of oppositely-wound series-connected current coils 64 and 66 on respective cores 68 and 70 adjacent one face of the disk 42. Adjacent the other face I dispose a voltage coil 72 having a core 74. The current coils 64 and 66 are supplied with electrical energy from a pair of lines 76 and 78 which are energized from a suitable source of electrical energy to be described in detail hereinafter. A potentiometer, indicated generally by the reference character 80, is connected as a rheostat in the line 76. A brush 82 provides an electrical connection between the coil 64 and the potentiometer 80. I provide a motor 84 having a shaft, indicated schematically by reference character 86, for rotating the potentiometer 80 in a manner to increase gradually the current flowing through the current coils 64 and 66. It will be appreciated that as the potentiometer 80 rotates and the current through coils 64 and 66 increases, a gradually increasing torque is applied to the disk 42 to rotate the rotor assembly 28. A portion of the surface of the potentiometer 80 is formed by an insulating segment 88. When the potentiometer has been rotated to a position where brush 82 engages this segment 88, the current coils 64 and 66 are disconnected from the source of energy so that the current flowing through the coils is zero and the torque has been removed from the rotor assembly 28.

The voltage coil 72 is supplied with electrical energy by a pair of conductors 90 and 92 connected respectively to the lines 76 and 78. A variable resistance 94 including a brush 96 provides a means by which the voltage applied to the coil 72 may be varied.

Any convenient means may be employed to detect a predetermined rotation of rotor assembly 28. In the form of the invention illustrated I employ a photoelectric relay including a phototube 98 disposed adjacent one face of the disk 42 near the periphery thereof. Phototube 98 is adapted to be energized by an electric lamp 100 disposed adjacent the other face of the disk 42. Disk 42 is provided with a plurality of holes 102 equally spaced around the disk close to the edge thereof. When a hole 102 is in a position between the light source 100 and the phototube 98, light from the source 100 passes through the hole 102 and impinges on the cathode 104 of tube 98 to energize the phototube. When, however, the space between the light source 100 and the phototube 98 is occupied by a portion of the disk 42 separating a pair of holes 102, the phototube is blacked out and deenergized. Phototube 98 is arranged to energize a relay to disconnect the counting elements from the circuit in a manner to be described hereinafter.

A cam 106 carried by the shaft 86 of the motor 84 provides a means for making a digital record of the slowly increasing torque applied to the disk 42 by the coils 64, 66, and 72. Cam 106 is formed with a number of radially extending peripheral projections 108 adapted to actuate a cam follower 110 riding on the surface of cam 106. As shaft 86 rotates potentiometer 80 to increase gradually the current in coils 64 and 66, cam 106 actuates follower 110 a number of times which corresponds to the amount of rotation of potentiometer 80 necessary to produce a torque which will rotate rotor assembly 28 and the outer bearing race 22 in a manner to be described in detail hereinafter.

A cycling cam 112 is also carried by the shaft 86. Cam 112 is formed with a single peripheral recess 114 in which a follower 116 rests when motor 84 is de-energized. When the motor 84 is started, follower 116 rides out of the recess 114 and actuates a relay to maintain the motor circuit. At the end of a cycle of rotation of the motor 84, follower 116 falls back into the recess 114. The operation of cam 112, follower 116, and the relay operated thereby will be described in connection with the electrical circuit of my torque meter. A cam count cam 118 for actuating follower 120 may be mounted on shaft 86. Follower 120 is arranged to energize a counter to indicate how many cam counts should be added to the total count provided by a total counter to be described hereinafter. These cam counts are added to the total count to provide a criterion for determining whether or not a particular bearing is representative of its production group, as will be explained hereinafter.

Referring now to Figure 2, the electrical circuit of my meter includes a source of electrical energy, indicated generally by the reference character 122, which supplies electrical energy to a pair of lines 124 and 126. The conductor 78 connects the series-connected current coils 64 and 66 to the line 126. The conductor 92 connects the line 78 to the voltage coil 72. Voltage coil 72 is connected to the variable resistance 94 by a conductor 128. The brush 96 associated with resistor 94 is connected to the line 124 by the conductor 90. It can be seen that the circuitry thus far described provides a means for supplying an adjustable voltage to the voltage coil 72. The variable resistance 94 provides a means for adjusting this voltage.

A conductor 130 connects the series-connected coils 64 and 66 to the brush 82 of the potentiometer 80. Line 76 and a conductor 132 connect the potentiometer 80 to line 134, which is connected by normally open contacts 135 to line 124. I provide a relay winding 136 adapted when energized to close contacts 135 through a linkage 137. One side of relay winding 136 is connected to line 126. The other side of winding 136 is connected by a conductor 138 and one pair of contacts of a start switch, indicated generally by reference character 140, to the line 124. It will be appreciated that when switch 140 is actuated, winding 136 is connected across the lines 124 and 126 so as to be energized to close contacts 135 through linkage 137. When this occurs, line 134 is connected to line 124. In order to maintain the circuit of coil 136 after switch 140 has been released, I provide a pair of normally open contacts 148 adapted to be closed by winding 136, when energized, through a linkage 150. One of the pair of contacts 148 is connected to coil 136 by a conductor 152. The other of contacts 148 is connected by a conductor 156 to a pair of normally closed cycling contacts 154. A conductor 158 connects the other of the normally closed contacts 154 to the line 124. When switch 140 is actuated, winding 136 is energized and closes contacts 148 through linkage 150. The closing of contacts 148 maintains the circuit of winding 136 after switch 140 is released. This circuit may be traced from line 126 through coil 136, through conductor 152, through the now-closed contacts 148, through conductor 156, through the normally closed contacts 154, and through conductor 158 to line 124. Contacts 135 remain closed and the connection between line 134 and line 124 is maintained by the holding contacts 148.

The potentiometer drive motor 84 is adapted to be energized by a pair of conductors 144 and 146 connected respectively to the line 134 and to the line 126. As explained hereinbefore, when switch 140 is actuated, line 134 is connected to line 124 and this circuit is maintained after switch 140 opens. When line 134 is so connected, motor 84 is energized to drive potentiometer 80. This circuit may readily be traced from line 124, through the now-closed contacts 135, through line 134, through conductor 144, through motor 84 and through conductor 146 to line 126.

The energization of line 134 also completes the circuit of the series-connected current coils 64 and 66. This circuit may be traced from line 124 through the contacts 135, through line 134, through conductors 132 and 76, through the potentiometer 80, through brush 82, through conductor 130, through the current coils 64 and 66 and through conductor 78 to line 126.

As the motor 84 rotates, it drives potentiometer 80 to decrease gradually the resistance in the current coil circuit. As the resistance decreases, the current flowing in the current coils increases to apply a gradually increasing torque to the disk 42. In order to provide a digital record of this gradually increasing torque, I mount the cam 106 on shaft 86 of the motor 84. Cam 106 actuates its follower 110 alternately to open and close a mercury switch or the like 160. One contact of the switch 160 is connected to the line 126 by a conductor 162. A conductor 164 connects the other contact of switch 160 to the conducting ring 166 of a rotary stepping switch, indicated generally by the reference character 168. Switch 168 includes a rotatable arm 170, formed of insulating material, which carries a contactor 172 on its end. Contactor 172 provides an electrical connection between one of a number of contacts 174 spaced around the periphery of the switch and the ring 166. Each of the contacts 174 is connected, respectively, to one of a number of individual counters 176. For example, the first contact 174 may be connected to the first counter 176 by a conductor 178. As many counters 176 may be provided as random torque measurements are desired. By way of example, ten only of the counters 176 have been shown. In order to provide a total count which is the sum of all the individual random torque measurements, I provide total counter 180. Counter 180 is connected to ring 166 by a conductor 182. Each of the individual counters 176 is connected at one terminal to a contact 174 of the switch 168. The total counter 180 is connected at one terminal to the ring 166 by conductor 182. The other terminal of each of the individual counters 176 and of the total counter 180 is connected to a line 184. Line 184 in turn is connected to one contact 186 of a latching relay, indicated generally by the reference character 188, by a conductor 190. When the arm 192 of this latching relay 188 engages contact 186, the latter contact is connected to the line 134 by the conductor 132.

It will readily be appreciated that depending upon the position of the arm 170, one of the contacts 174 and its associated counter 176 are connected to the ring 166 of the switch. Upon each actuation of the follower 110 by the cam 106, the circuit of the connected counter is completed to energize the counter. This circuit may readily be traced from line 126 through conductor 162, through the switch 160 (closed by the action of cam follower 110), through conductor 164, through the conducting ring 166, through contactor 172, through contact 174, through the conductor 178, through counter 176, through line 184, through conductor 190, through relay switch 188, and through conductor 132 to line 134. As explained hereinbefore, line 134 is connected to line 124. As long as the contact arm 192 of relay 188 is in a position where it engages contact 186, the connected counter 176 will be energized on each actuation of the follower 110 as the potentiometer 80 is rotated by motor 84. It is to be noted that irrespective of the position of arm 170 of switch 168, the total counter 180 will be energized upon each actuation of cam follower 110 as long as relay 188 is in a position where its arm 192 engages the contact 186. I have provided means for actuating relay 188 to move its arm 192 out of engagement with the contact 186 and thereby disconnect the counters after a predetermined rotation of the rotor assembly 28.

I provide a cam count counter 194 associated with the follower 120. This counter is energized each time the rotation of potentiometer 80 exceeds a certain value. It finally indicates the number of cam counts which must be added to the reading provided by the total counter to determine whether a particular bearing is within its production group. It is connected at one terminal to line 184. The other terminal of the counter is connected to one contact of a mercury switch 196 by a conductor 198. The other contact of mercury switch 196 is connected to the line 126 by conductor 162. It will be readily appreciated that the counter 194 is energized upon each actuation of the cam count follower 120 by the cam count cam 118. This counter is likewise disconnected when relay 188 is actuated to move its arm 192 out of engagement with the contact 186.

I have provided photoelectric means for detecting a predetermined rotation of the rotor assembly 28 and disk. This detecting means includes a photoelectric relay, indicated generally by the reference character 200. This relay is supplied with electrical energy by the lines 124 and 126. It includes the phototube 98. The light source 100 for operating the photoelectric relay is supplied with electrical energy from the secondary winding 202 of a transformer, indicated generally by the reference character 204. The primary winding 206 of the transformer 204 is energized by the line 190 connected to the contact 186 of relay 188 and a conductor 208 connected to the line 126. It will be appreciated that relay 188 provides a connection to line 134 which is connected to the line 124. When relay 188 is operated, the winding 206 is de-energized and the light turned off.

Disk 42 is formed with a plurality of holes 102 spaced around the disk adjacent the edge thereof. These holes permit the passage of light from source 100 through the disk and onto the cathode 104 of tube 98. As the disk rotates, therefore, cathode 104 is alternately light and dark. When a hole 102 is in a position to permit the energization of the tube 98, the arm 210 of the relay engages one of a pair of contacts 212 and 214. For example, it may engage contact 214 as shown in Figure 2. When the light from source 100 is blocked by a portion of disk 42 separating a pair of holes 102, arm 210 engages the other of the pair of contacts 212 and 214. The relay 200 energizes relays to be described hereinafter to operate relay switch 188 to disconnect the counters and turn off the light 100. Since the rotor is permitted to coast to a stop when the insulating segment 88 on the potentiometer is engaged by brush 82 and a the beginning of a cycle may be in either a light or dark position, my detecting means is arranged to detect a change in rotor position rather than absolute rotor position. Moreover, the counters are disconnected after the second change in rotor position rather than after the first change in order to overcome the bearing "kick back" which would result in false readings if the first change in rotor position were used.

The contact 212 of relay 200 is connected to one side of a relay winding 216 by a conductor 218. The other side of the winding 216 is connected to the line 134. The contact 214 is connected to one side of a relay winding 220 by a conductor 222. The other side of the relay winding 220 is connected to the line 134. A conductor 224 connects the contact arm 210 of relay 200 with the line 126. The photo relay is adapted to energize windings 216 and 220 alternately on successive energizations of the relay. Consequently, if winding 216 is de-energized so that its associated arm 226 is in the up position as viewed in Figure 2, winding 220 will be energized so that its associated arm 228 is in the down position as viewed in Figure 2. When arm 210 engages contact 212, the circuit of winding 216 is complete while the circuit of winding 220 is incomplete. When arm 210 engages contact 214, winding 220 is energized and winding 216 is de-energized.

The respective arms 226 and 228 are electrically connected by a conductor 230. Arm 226 engages one of a pair of contacts 232 and 234 while arm 228 engages one of a pair of contacts 236 and 238. The contacts 234 and 238 are connected by a common conductor 240 which is connected to line 126 by a conductor 242. Contact 232 is connected to one side of a relay winding 244, the other side of which is connected to line 134 by a conductor 246. A relay winding 248 is connected between the contact 236 and conductor 246. As explained hereinbefore, after each energization of the photo relay 200, either arm 226 will be up and arm 228 down or arm 226 will be down and arm 228 up. If arm 226 is up and arm 228 down, winding 244 will be energized. This circuit may be traced from line 134 (connected to line 124), through conductor 246, winding 244, contact 232, arm 226, conductor 230, arm 228, contact 238, and conductors 240 and 242 to line 126. When this condition exists, the circuit through winding 248 which is connected at one side to the contact 236 is not complete. Winding 244, when energized, actuates its associated contact arm 250 to engage the contact 254 of a pair of contacts 252 and 254. When winding 248 is de-energized, its associated contact arm 256 engages the contact 258 of a pair of contacts 258 and 260. The arms 250 and 256 are connected by a conductor 262. Contact 252 is connected to one side of a relay winding 264, the other side of which is connected to line 126 by a conductor 266. Contact 258 is connected to line 134 by a conductor 268. From the foregoing it will be appreciated that when contact arm 226 associated with the winding 216 is up and the arm 228 associated with the winding 220 is down, winding 244 is energized to move its associated arm 250 into engagement with contact 254. At this time, however, winding 248 is not energized so that its arm 256 engages contact 258. Under these conditions, no complete circuit can be traced through the latching relay winding 264.

When arm 226 is down while arm 228 is up, the circuit of winding 244 is incomplete so that its arm 250 engages contact 252. At the same time, the circuit of winding 248 is complete so that its arm 256 engages contact 260. Under this set of conditions, no circuit can be traced through the winding 260 since arm 256 engages the contact 260.

From the foregoing it will be appreciated that after an operation of the photo relay so that arm 210 engages either of the contacts 212 or 214, no circuit can be traced through the winding 264. I select the relay arms 226 and 228 to have a sufficiently long transit time such that during the operation of the photo relay there will be an interval in which both are in mid air. During this interval, no complete circuit is provided for either of the windings 244 or 248. Consequently, both the arms 250 and 256 will be in the up position where they engage the respective contacts 252 and 258. When this condition exists, a complete circuit may be traced for the winding 264 from line 126 through conductor 266, through winding 264, through contact 252, through arm 250, through conductor 262, through arm 256, through contact 258, and through conductor 268 to line 134 which is connected to line 124.

Winding 264, when energized, actuates its associated arm 270 to engage the contact 272 of the pair of contacts 272 and 274. A conductor 276 connects arm 270 to the line 126. Contact 272 is connected to one side of a latching relay winding 278, the other side of which is connected to line 134 by a conductor 280. Contact 274 is connected to the arm 282 associated with winding 278. When winding 264 is energized during the operation of the photo relay, it moves its contact arm 270 into engagement with the contact 272 to complete the circuit of a winding 278. The circuit of winding 278 may be traced from line 126 through conductor 276, through the arm 270, through contact 272, through winding 278, and through conductor 280 to the line 134, which is connected to the line 124. When energized, winding 278 actuates its arm 282 to engage the contact 284 of a pair of contacts 284 and 286. It is to be understood that the relays including arms 270 and 282 are of the latching type. That is, when they have been actuated by their respective windings, they remain in the position to which they have been moved until the next energization of the winding when they are moved to the other position. Contact 284 is connected to one side of a relay winding 288 by a conductor 290. The other side of winding 288 is connected to the line 134 by the conductor 280.

After one operation of the photo relay 200, arms 270 and 282 will be in the up positions as viewed in Figure 2. At this time no complete circuit can be traced for the latching relay winding 288. During the next operation of the photo relay, arm 270 is moved down to engage contact 274. When this occurs, a complete circuit may be traced for winding 288 from line 126 through arm 270, contact 274, arm 282, contact 284, conductor 290, winding 288, and conductor 280 to line 134, which is connected to line 124. Winding 288, when energized, actuates its associated arm 192 to move it out of engagement with contact 186. This action disconnects the counters from the circuit so that they no longer count as the potentiometer rotates and disconnects light source 100.

It is to be noted that the action of the relay system just described takes place after a predetermined rotation of rotor assembly 28 and the disk 42 carried thereby. This rotation is measured by two changes in position of the disk 42. These changes are determined by the position of holes 102 with respect to the phototube 98. The changes may be from light to dark and then from dark to light or from dark to light and then from light to dark. Since the relay system is responsive to two changes in rotor position, the possibility of false readings resulting from bearing "kick back" is eliminated.

Associated with each of the respective arms 282 and 192 are auxiliary windings 292 and 294 connected at one side of each by a common conductor 296. Conductor 296 is connected by a conductor 304 to one contact 298 of a first pair of contacts 298 and 300 of the cycling switch, indicated generally by the reference character 302. The other sides of the windings 292 and 294 are connected by a common conductor 306 to the lines 126. Contact 300 is connected to the line 124 by a conductor 307. When motor 84 is energized, the cycling cam follower 116 rides out of recess 114 so that its associated contact arm 308 connects the contacts 298 and 300. When this condition exists, the circuits of the windings 292 and 294 are complete.

After arm 192 has been actuated to disconnect the counters from the circuit, potentiometer 80 continues to rotate to reduce the resistance in the current coil circuit substantially to zero. Consequently, a large torque is applied to disk 42 and the rotor assembly 28. When the potentiometer reaches a position where brush 82 engages the insulating segment 88, the circuit to the current coils is interrupted and the torque removed. The rotor is then permitted to ride to a stop in a new random position. Eddy currents resulting from the action of the still energized voltage winding 72 aid in bringing the rotor to a stop.

After a first random measurement of starting torque has been made, it is desirable that the succeeding measurements for the bearing under test be made automatically without the necessity of adjustments by the operator. I have provided a means for stepping the rotary switch 168 to a position where the next counter 176 is connected in the circuit and a new test is automatically begun. I provide a reset coil 310 adapted, when energized, to step the arm 170 of switch 168 to the succeeding contact through a linkage 312. I also provide a timing relay coil 316 and a cycling relay coil 318 connected in parallel. Coil 310 is connected in parallel with coils 316 and 318 by respective conductors 314 and 326. Conductor 326 is connected to the line 126 by a conductor 320. Line 314 is connected by a conductor 321 to a contact 322 of a second pair of contacts 322 and 324 associated with cycling switch 302. It will readily be appreciated that the connections just described connect the parallel-connected coils 310, 316, and 318 between line 126 and contact 322 of cycling switch 302. At the end of a cycle of rotation of motor 84, follower 116 drops into the recess 114 of the cycling cam 112. Its contact arm 308 then cross-connects contacts 322 and 324 to complete the circuits of the respective coils 310, 316, and 318 through the conductor 308 connected to line 124. The energization of coil 310 steps switch arm 170 to a position where contactor 172 engages the next succeeding contact 174 to connect the next individual counter 176 in the circuit.

The energization of the cycling coil 318 by the operation of switch 302 opens the normally closed cycling relay contacts 154 to interrupt the circuit of coil 136 and permit contacts 135 to open and de-energize lines 134. It will be appreciated that the de-energization of line 134 interrupts the circuit to motor 84 to permit the motor to stop and interrupts the circuit to current coils 64 and 66.

In order to restart the motor for the next measurement without the necessity of pressing push button switch 140, I provide the timing relay coil 316. The coil 316 is arranged to close normally open contacts 330 through a linkage 332 a predetermined time after coil 316 is energized. One of the contacts 330 is connected by conductor 158 to line 124. The other of the contacts 330 is connected by a conductor 336 to one of a pair of contacts associated with a contact arm 334. Arm 334 is connected by conductor 138 to coil 136. Arm 334 is arranged to be moved to engage one or the other of its associated contacts and latch in the position to which it is moved. The arrangement is such that during the time when a series of measurements is being made, arm 334 engages the upper one of its associated contacts. A predetermined time after the cycling switch 302 is closed and the motor circuit is opened by the energization of winding 318 which opens contacts 154 to de-energize coil 136 to permit contacts 135 to open, winding 316 closes normally open contacts 330 to re-energize winding 136 and thus restart motor 84 and begin the next measurement of starting torque. The circuit of coil 136 may then be traced from line 124 through conductor 158, through the now-closed contacts 330, through conductor 336, through the arm 334, through conductor 138, and through winding 136 to line 126. This re-energization of winding 136 again closes contacts 135 to complete the motor circuit as before by energizing line 134. It will be appreciated that when contacts 154 are opened at the end of a cycle, winding 136 is de-energized so that holding contacts 148 are opened. The circuit of winding 136 is again energized, however, when contacts 330 are closed so that it in turn again closes holding contacts 148. When the motor again starts, cam follower 116 moves out of the recess 114 to operate switch 302 to de-energize coils 316 and 318 and permit their contacts to open and close, respectively. The delay provided by winding 316 in closing contacts 330 is selected so that the rotor assembly 28 has sufficient time to come to a stop. During the time interval between the time when the motor stops and the time when it is restarted, windings 292 and 294 associated with relay contact arms 282 and 192 are de-energized to permit them to reset. This results from the disconnection of conductor 304 from contactor 308 when switch 302 is actuated.

In order to prevent restarting of motor 84 by winding 316 after the last measurement of a group has been taken, I provide a winding 340 adapted, when energized, to move arm 334 through a linkage 342 out of engagement with its upper associated contact and into engagement with the lower one of its associated contacts. When this has been accomplished, the closing of contacts 330 no longer restarts the motor. A conductor 344 connects one side of the winding 340 to line 184. A conductor 346 connects the other side of winding 340 to the last of the individual counters 176. When the arm 170 has been stepped to a position where contactor 172 engages the contact 174 associated with the last individual counter 176 and follower 110 is actuated to energize the last counter, winding 340, connected in parallel with the last counter 176, will be energized to move arm 334 to an open position. Arm 334 remains in this position until a reset coil 142 is energized. When arm 334 is in the open position and contacts 330 are closed at the end of this last cycle, the circuit of the motor 84 is no longer complete through the contacts 330 and it will not be energized. It, therefore, becomes necessary to push the button 140 to begin a new series of measurements. Generally, the bearing under test is replaced by a new bearing before the next series of tests is begun. In order to move arm 334 to a closed position before the next series of measurements is made, I provide a re-set coil 142 adapted when energized to close contact arm 334 through a linkage 141. One side of coil 142 is connected to line 126 by a conductor 348. The other side of coil 142 is connected by a conductor 350 to one contact of a second pair of contacts of push button switch 140. The other of the second pair of contacts is connected to line 124 by a conductor 352. It will be appreciated that when switch 140 is actuated to begin a new series of measurements, the circuit of winding 142 is momentarily completed to energize the winding and thereby move arm 334 up, as viewed in Figure 2, to a closed position. This circuit may readily be traced from line 126 through conductor 348, through coil 142, through conductor 350, through switch 140, and through conductor 352 to line 124.

It is to be understood that any number of individual readings of starting torque may be made on a particular bearing to determine whether or not it is representative of its production group. Conveniently, I may make ten such random measurements of starting torque. I have arranged my meter so that the total count on the meter 180 may be used in a pass-fail test to determine whether or not the bearing under test is within the arbitrary acceptance standards set up for its production group. The random measurements made for a particular bearing under test may be split into two groups, one including measurements which are above the average for all the measurements and the other of which includes the readings below that average. The highest possible sum of the low readings for a particular production group may be represented by:

(1) $$S_1 = n_1(X' + A_1\sigma')$$

where $n_1$ is the number of readings in the low group, $X'$ is the average for a half distribution, $\sigma'$ is the standard deviation of a half distribution, and $A_l$ is a control limit factor corresponding to the number of low readings as stated in the "ASTM Manual on Quality Control of Materials," page 72, table III. Similarly, the highest possible sum of the readings of the measurements which are above the average may be expressed:

(2) $$S_h = n_h(X' + A_h\sigma')$$

where $n_h$ is the number of readings above average, and $A_h$ is the factor for control limits corresponding to the number of high readings. The highest possible sum of all readings for a group of readings irrespective of its family will be $S_l$ plus $S_h$. If, for example, ten random measurements are made, the half distribution average will be:

(3) $\quad X' = \overline{X} + 0.778\sigma$ in Equation (1)

(3') $\quad X' = \overline{X} - 0.778\sigma$ in Equation (2)

and (4) $$\sigma' = 0.6\sigma$$

where $\overline{X}$ is the average of the statistical universe representing a production group and $\sigma$ is the standard deviation of the production group. I may then write (1) and (2) as:

(5) $$S_l = n_l(\overline{X} + 0.778\sigma + 0.6A_l\sigma)$$

and (6) $$S_h = n_h(\overline{X} - 0.778\sigma + 0.6A_h\sigma)$$

Equations 5 and 6 may be added to determine the highest total sum $S_T$ for a group of measurements which a particular bearing may have and yet be representative of its production group. For any universe with dimensions $\overline{X}$ and $\sigma$ representing a particular production group, these highest totals for any split of the measurements may be determined from the following table:

Table I

| Split | Highest total within universe |
|---|---|
| 0-10 | $10\overline{X} + 13.470\sigma$ |
| 1- 9 | $10\overline{X} + 13.424\sigma$ |
| 2- 8 | $10\overline{X} + 12.210\sigma$ |
| 3- 7 | $10\overline{X} + 10.989\sigma$ |
| 4- 6 | $10\overline{X} + 9.566\sigma$ |
| 5- 5 | $10\overline{X} + 8.050\sigma$ |
| 6- 4 | $10\overline{X} + 6.454\sigma$ |
| 7- 3 | $10\overline{X} + 4.765\sigma$ |
| 8- 2 | $10\overline{X} + 2.974\sigma$ |
| 9- 1 | $10\overline{X} + .976\sigma$ |
| 10- 0 | $10\overline{X} - 2.09\sigma$ |

This table may readily be plotted using the group splits as abscissas and the sums of the readings as ordinates. The resulting curve may be approximated by a straight line whose equation is of the general form:

(7) $$y = mx + b$$

where $y$ is the highest possible sum of the readings of a group for a particular split, $m$ is the slope of the line, and $b$ is the value of the ordinate at the point where the line crosses the ordinate axis. The term $x$ will, of course, represent the group number where the groups are numbered 0 for the group having a split 10-0 through 10 for the group having a 0-10 split. The slope of the line may readily be determined for any particular universe by analytical methods and will be expressed in terms of $\sigma$. If particular values are determined for $\overline{X}$ and $\sigma$ for a given production group, the slope may readily be approximated in terms of counts. In my meter arrangement for any reading below the predetermined production group average, I add a cam value count approximately equal to the slope $m$ to the reading of the counter. This may be accomplished by any convenient means. For any reading which is greater than the average, no count is added. All acceptable groups of ten readings will then have a count which is not in excess of $y = 10m + b$. It is, consequently, necessary only to look at the total count on the counter 180, including the cam values added, to determine whether a particular bearing under test is representative of its production group. For analysis purposes the individual torque measurements are represented by the counts on the counters 176. Cam value counter 194 may be employed to give an indication of the number of cam values which must be added to the count of total counter 180. It is to be understood that if only an average torque measurement and a total torque measurement are required, the individual counters 176 may be eliminated. Similarly, only a peak and an average counter could be employed.

In operation, when a bearing is to be tested on my torque meter, it is placed on the stand 10 around the member 14 in a manner to be supported on the stand by its inner race 20. The rotor assembly 28 and the disk 42 carried thereby are then placed on the outer race 22 of the bearing. When the testing set is energized, lines 124 and 126 are energized. Consequently, the photo relay 200 and the voltage coil 72 are energized. Since before the motor starts, follower 116 is in the recess 114, the circuits of coils 292 and 294 are not energized. To start a series of tests, the push button switch 140 is actuated. This operation completes the circuit of coil 136 to close contacts 135 to energize line 134 and start motor 84 and energize current coils 64 and 66. Coil 136 also closes contacts 148 to maintain line 134 energized after the push button is released. At the same time, coil 142 is momentarily energized to re-set arm 334. As motor 84 rotates, it drives potentiometer 80 to decrease the resistance in the current coil circuit and, consequently, gradually increase the torque applied to the rotor 28 by disk 42. When this torque reaches a certain level, disk 42 and rotor assembly 28 begin to rotate. In the initial position of disk 42 arm 210 of photo relay 200 will engage either contact 212 or contact 214. When the disk 42 begins to rotate, the light beam to phototube 98 will be interrupted or re-established, depending upon the initial position of the disk 42 to actuate the relay 200. This change in condition of the photo relay causes contact arm 210 to move from one of the contacts 212 or 214 to the other of the contacts. As has been explained hereinabove, during the period when the photo relay is being actuated, arms 226 and 228 will be in mid air. When this condition exists, neither of the coils 244 and 248 is energized, so that their respective arms are both in the up position and coil 264 is energized to move arm 270 up into engagement with contact 272. Consequently, arm 282 engages contact 284 and latches in that position. On the succeeding operation of the photoelectric relay, coil 264 is again energized to move arm 270 from contact 272 to contact 274. As a result, winding 288 is energized to lift the arm 192 out of engagement with contact 186 to disconnect the counters from the circuit. It will be appreciated that arm 192 is lifted after the second change in rotor position.

During the period before arm 192 is raised and while motor 84 is energized, one of the counters 176 is energized a number of times by the closing of switch 160 under the action of cam 106 which operates follower 110. When the potentiometer has rotated to a position where the torque is sufficient to rotate disk 42 through two changes in position, arm 192 is lifted to disconnect the counters from the circuit. The connected counter 176 will, therefore, show a count which is representative of the torque necessary to produce two changes in rotor position. This count is also recorded on the total counter 180.

After the counters have been disconnected, the potentiometer 80 continues to rotate to increase the torque on rotor 28. When brush 82 of the potentiometer 80 strikes the insulating segment 88, the torque is suddenly removed and the rotor is permitted to come to a stop. At the end of each measurement, follower 116 falls into the recess 114 and actuates cycling switch 302 to energize the stepping coil 310 associated with switch 168. Coil 310 steps arm 170 so that contactor 172 engages the contact 174 associated with the next succeeding counter. The actuation of cycling switch 302 also energizes winding 318 to open contacts 154 and de-energize motor 84 and current coils 64 and 66. A predetermined time after the motor stops, timing relay coil 316 closes contacts 330 to initiate a new measuring cycle. It is to be noted that when arm 192 is lifted, light source 100 is extinguished. Moreover, when cycling switch 302 is actuated, windings 292 and 294 are disconnected to permit their associated relays to reset.

After the desired number of random measurements have been made, winding 340, connected in parallel with the last individual counter 176, is energized upon the first closing of switch 160 to move arm 334 to the open position in which it remains until coil 142 is energized by closing switch 140. Closing of contacts 330 no longer initiates a new cycle. When a new bearing is to be tested or a new series of measurements to be made, push button switch 140 is closed to start motor 84 rotating. Operation of push button switch 140 also energizes coil 142 to reset arm 334.

After a series of measurements has been completed, each individual measurement is represented by a count on one of the counters 176. The total count on counter 180 may be employed in a pass-fail test to determine whether the bearing tested is representative of its production group. The cam value counter 194 may be employed to indicate the number of cam count values which must be added to the total count on counter 180. The data resulting from my test may be employed to analyze the bearing torque or merely to make pass-fail tests on bearings.

It will be seen that I have accomplished the objects of my invention. I have provided a torque meter for measuring the starting torque of rolling bearings with a high degree of accuracy. My meter treats the starting torque of a rolling bearing as a statistical quantity. It tests bearings in a rapid and expeditious manner. The data resulting from a test run on my meter may be employed in a pass-fail test to determine whether a particular bearing is representative of its production group or it may be used to analyze the bearing starting torque characteristic.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A torque meter for measuring the starting torque of rolling bearings having a pair of races and rolling elements including in combination means for supporting said bearing by a first one of said races, means for applying a gradually increasing torque to the second one of said races to produce a predetermined rotary displacement of the second race, means for detecting said predetermined rotary displacement of said second race, means responsive to said torque-producing means for making a digital record of torque and means responsive to said detecting means for actuating said record-producing means to determine the end of a test when said record-producing means carries a record of the torque necessary to produce said predetermined rotary displacement.

2. A torque meter as in claim 1 including means for further increasing said torque after said digital record has been made and means for removing said torque to permit said second race to come to rest in a random position.

3. A torque meter as in claim 1 including means for further increasing said torque after said digital record has been made, means for removing said torque to permit said second race to come to rest in a random position, automatic means for reapplying said gradually increasing torque after said second race has come to rest to reproduce said predetermined rotary displacement, said means responsive to said detecting means actuating said record-producing means to make a digital record of the re-established torque necessary to produce the predetermined rotary displacement.

4. A torque meter as in claim 1 including automatic cycling means for successively removing said torque after said digital record has been made to permit the second race to come to rest and re-establishing said gradually increasing torque after the second race has come to rest to make a predetermined number of starting torque measurements, said means for producing a digital record producing a number of readings corresponding to said predetermined number of measurements.

5. A torque meter as in claim 1 including automatic cycling means for successively removing said torque after said digital record has been made to permit the second race to come to rest and re-establishing said gradually increasing torque after the second race has come to rest to make a predetermined number of starting torque measurements, said means for producing a digital record producing a number of readings corresponding to said predetermined number of measurements and means responsive to the operation of said automatic cycling means for disabling said automatic cycling means at the end of said predetermined number of measurements.

6. A torque meter as in claim 1 wherein said means for applying a gradually increasing torque to the second race includes an eddy current disk, means for mounting said eddy current disk on said second race, a voltage coil, a current coil, and means for gradually increasing the current flow through said current coil.

7. A torque meter as in claim 1 wherein said means for producing a digital record of said gradually increasing torque includes a counter, a cam-operated switch for successively energizing said counter a certain number of times as said torque increases, a cam for operating said switch, means for driving said cam as said torque increases and wherein said means responsive to said detecting means includes means for disconnecting said counter from said switch after said predetermined rotary displacement of said second race.

8. A torque meter as in claim 1 wherein said means for applying the gradually increasing torque includes an eddy current disk, said means for producing the digital record including a counter, means for successively energizing said counter a certain number of times as said torque increases, and wherein said means responsive to said detecting means includes a photoelectric relay, a light source for producing a light beam to operate said relay, said disk formed with means for alternately interrupting and re-establishing said light beam and relay means actuated by said photoelectric relay for disconnecting said counter from said means for energizing the counter after a predetermined number of interruptions and re-establishments of said light beam.

9. A torque meter for measuring the starting torque of rolling bearings having a pair of races and rolling elements including in combination a support for supporting said bearing by a first one of said races, means for applying a gradually increasing torque to a second one of said races to produce a predetermined rotary displacement of said second race, means responsive to said means for applying the gradually increasing torque for producing a digital record of the torque necessary to produce said predetermined rotary displacement of said second race, means responsive to said predetermined rotary displacement for disabling said record-producing means, means responsive to said torque-applying means for disabling said torque-applying means after said record has been made to permit the second race to come to rest in a random position and automatic cycling means for actuating said means for applying the gradually increasing torque whereby a number of measurements of starting torque are made.

10. A torque meter as in claim 9 wherein said means for producing the digital record includes a plurality of individual counters and means for successively energizing the counters during succeeding measurements to produce a number of individual digital records corresponding to the number of measurements.

11. A torque meter as in claim 9 wherein said means for producing a digital record includes a plurality of counters, a cam-operated switch for energizing one of said counters a certain number of times as the torque increases, a stepping relay for successively connecting said counters to said cam-operated switch during succeeding torque measurements, means for operating said stepping relay at the end of each measurement and means for disconnecting the connected counter at the end of said predetermined rotation of the second race.

12. A torque meter as in claim 9 wherein said means for applying a gradually increasing torque includes an eddy current disk, means for mounting said eddy current disk on said second race, a source of electrical energy, a voltage coil associated with said disk, a current coil associated with said disk, said voltage coil being connected across said source, said current coil being connected in series with the source, a potentiometer in series with said current coil and means for driving said potentiometer to produce a gradually increasing torque on said second race.

References Cited in the file of this patent

UNITED STATES PATENTS

| | | |
|---|---|---|
| 1,904,438 | Freeman | Apr. 18, 1933 |
| 2,301,935 | Ehringhaus | Nov. 17, 1942 |
| 2,398,156 | Puterbaugh et al. | Apr. 9, 1946 |
| 2,538,243 | Hazard et al. | Jan. 16, 1951 |
| 2,538,790 | Merrill | Jan. 23, 1951 |
| 2,722,824 | Jensen et al. | Nov. 8, 1955 |

FOREIGN PATENTS

| | | |
|---|---|---|
| 401,733 | Italy | Jan. 29, 1943 |